United States Patent
Salimi et al.

(10) Patent No.: US 11,554,556 B2
(45) Date of Patent: Jan. 17, 2023

(54) OPTIMIZATION OF LAYUP PROCESS FOR FABRICATION OF WIND TURBINE BLADES USING MODEL-BASED OPTICAL PROJECTION SYSTEM

(71) Applicant: TPI Composites, Inc., Warren, RI (US)

(72) Inventors: Amirhossein Salimi, Des Moines, IA (US); Scott Larson, Somerset, MA (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/146,146

(22) Filed: Jan. 11, 2021

(65) Prior Publication Data
US 2021/0138743 A1    May 13, 2021

Related U.S. Application Data

(63) Continuation of application No. 16/023,891, filed on Jun. 29, 2018, now Pat. No. 10,889,075.
(Continued)

(51) Int. Cl.
  B32B 41/00 (2006.01)
  B29C 70/30 (2006.01)
  (Continued)

(52) U.S. Cl.
  CPC .............. B29C 70/30 (2013.01); B29C 70/38 (2013.01); B29D 99/0025 (2013.01);
  (Continued)

(58) Field of Classification Search
  CPC ................... B29C 70/38; B29C 70/30; B29C 2945/76461; B29C 70/541; G06F 30/00;
  (Continued)

(56) References Cited

U.S. PATENT DOCUMENTS

| 6,045,651 A | 4/2000 | Kline et al. |
| 10,889,075 B2 | 1/2021 | Salimi et al. |

(Continued)

FOREIGN PATENT DOCUMENTS

| CN | 102975375 A | 3/2013 |
| CN | 106029347 A | 10/2016 |

(Continued)

OTHER PUBLICATIONS

"Advanced Rotor Blade Manufacturing Using LAP's Laser Projection System," Accessed Online:https://w3.windfair.net/wind-energy/news/22835-advanced-rotor-blade-manufacturing-using-lap-s-laser-projection-system-composite-pro (Sep. 15, 2016).

(Continued)

*Primary Examiner* — Michael N Orlando
*Assistant Examiner* — Joshel Rivera
(74) *Attorney, Agent, or Firm* — Stephen J. Kenny; Vincenzo DiMonaco; Foley Hoag LLP

(57) ABSTRACT

A method to design the kits and layup the reinforcement layers and core using projection system, comprising a mold having a contoured surface; a layup projection generator which: defines a plurality of mold sections; identifies the dimensions and location for a plurality of layup segments. A model-based calibration method for alignment of laser projection system is provided in which mold features are drawn digitally, incorporated into the plug(s) which form the wind turbine blade mold, and transferred into the mold. The mold also includes reflective targets which are keyed to the molded geometry wherein their position is calculated from the 3D model. This method ensures the precision level required from projection system to effectively assist with fabrication of wind turbine blades. In this method, digital location of reflectors is utilized to compensate for the mold deformations.

16 Claims, 14 Drawing Sheets

Related U.S. Application Data

(60) Provisional application No. 62/625,735, filed on Feb. 2, 2018, provisional application No. 62/527,726, filed on Jun. 30, 2017.

(51) Int. Cl.

| | |
|---|---|
| *B29C 70/38* | (2006.01) |
| *F03D 1/06* | (2006.01) |
| *B29D 99/00* | (2010.01) |
| *G06F 30/00* | (2020.01) |
| *G06F 30/17* | (2020.01) |
| *G06F 30/20* | (2020.01) |
| *B29L 31/08* | (2006.01) |
| *G06F 113/24* | (2020.01) |
| *G06F 113/26* | (2020.01) |

(52) U.S. Cl.
CPC ........... *F03D 1/0675* (2013.01); *G06F 30/00* (2020.01); *G06F 30/17* (2020.01); *G06F 30/20* (2020.01); *B29C 2945/76461* (2013.01); *B29L 2031/085* (2013.01); *F05B 2230/60* (2013.01); *F05B 2230/604* (2013.01); *F05B 2240/21* (2013.01); *F05B 2260/84* (2013.01); *G06F 2113/24* (2020.01); *G06F 2113/26* (2020.01)

(58) Field of Classification Search
CPC ...... G06F 30/17; G06F 30/20; G06F 2113/24; G06F 2113/26; B29D 99/0025; F03D 1/0675; B29L 2031/085; F05B 2230/60; F05B 2260/84; F05B 2240/21; F05B 2230/604; Y02P 70/50; Y02E 10/72

USPC .................... 156/60, 64, 350, 351, 378, 379
See application file for complete search history.

(56) References Cited

U.S. PATENT DOCUMENTS

| | | |
|---|---|---|
| 2005/0082262 A1 | 4/2005 | Rueb et al. |
| 2005/0280803 A1 | 12/2005 | Slesinski et al. |
| 2007/0127015 A1 | 6/2007 | Palmateer et al. |
| 2016/0319801 A1 | 11/2016 | Smith |
| 2021/0138743 A1 | 5/2021 | Salimi et al. |

FOREIGN PATENT DOCUMENTS

| | | |
|---|---|---|
| CN | 106042413 A | 10/2016 |
| WO | WO-2013/110895 A1 | 8/2013 |
| WO | WO-2016/046788 A1 | 3/2016 |
| WO | WO-2016/103125 A1 | 6/2016 |
| WO | WO-2019/006353 A1 | 1/2019 |

OTHER PUBLICATIONS

International Search Report and Written Opinion for International Application No. PCT/US2018/40374 dated Nov. 6, 2018.

Invitation to Pay Additional Fees And, Where Applicable, Protest Fee for International Application PCT/US18/40374 dated Sep. 11, 2018.

Extended European Search Report for EP Application No. EP 18824179 dated Mar. 3, 2021.

Rieckmann., "Laser projectors benefit turbine blade manufacture," Focus, http://www.renewableenergyfocus.com/view/15485/laser-projectors-benefit-turbine-blade-manufacture/ 9 (2011).

Laser projection line

Laser projection line

OPTIMIZATION OF LAYUP PROCESS FOR FABRICATION OF WIND TURBINE BLADES USING MODEL-BASED OPTICAL PROJECTION SYSTEM

CROSS-REFERENCE TO RELATED APPLICATIONS

This application is a Continuation of, and claims the benefit of priority under 35 U.S.C. § 120 to U.S. application Ser. No. 16/023,891, filed Jun. 29, 2018, which claims the benefit of priority under 35 U.S.C. § 119(e) of U.S. Provisional Application No. 62/625,735 filed Feb. 2, 2018 and U.S. Provisional Application No. 62/527,726 filed Jun. 30, 2017, the entire contents of each are hereby incorporated by reference.

THE FIELD OF THE DISCLOSED SUBJECT MATTER

The disclosed subject matter relates to a system for manufacturing wind turbine blades. Particularly, the present disclosed subject matter is directed to layup process of the wind turbine blade that corrects for reinforcement layers dislocation, core shifts or unwanted gaps to thereby preserve the structural integrity of the blade.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

The sandwich composite structure of wind turbine blades allows for reaching the desired mechanical performance of the system while keeping the weight of the blade minimal. In this arrangement, main structural elements i.e. girders provide the load carrying capacity, reinforcement layers form the aerodynamic surface of the blade and core material plays a critical role in supporting the skins from deformation and maintaining the shape of the cross section. Consequently, layup process is a sensitive and important step in fabrication of the wind turbine blade as any reinforcement layer dislocation, core shifts or unwanted gaps could compromise the structural integrity of the blade.

During the fabrication process and to facilitate the layup process as well as transportation of material to the molds, reinforcement and core material is cut into smaller pieces known as "kitting". Poor design of kits leads to increased production cycle time and extends the risk of core gaps and quality issues as the in-mold tailoring and trimming activities will be increased.

In accordance with an aspect of the present disclosure, an optical (e.g. laser) projection system is provided that optimizes glass/core kitting process and facilitates manufacture of the blade. Optimized kitting patterns not only address the quality concerns, but also shorten the production cycle time as well as the new product launch period significantly.

The traditional method to kit the glass/core material is to use CAD drawings and 3D models of the blade to specify the edges and contours and provide it to the suppliers to cut the parts. However, as CAD-based kitting patterns deviate from actual parts in the mold, multiple iterations of kiting pattern revisions are required before the parts fit the mold properly. Since there is no robust way of measuring the gaps and specifying the deviations under conventional techniques, this iterative revision process is extremely time taking and tedious. In accordance with an aspect of the present disclosure, the manufacturing process utilizes an optical (e.g. laser) projection system to close this loop, calibrate the 3D model and update the kitting pattern using the glass cuts and core panels' projection in the molds. Model-based calibration of projection system also ensures the desired level of accuracy in the process.

The accompanying drawings, which are incorporated in and constitute part of this specification, are included to illustrate and provide a further understanding of the method and system of the disclosed subject matter. Together with the description, the drawings serve to explain the principles of the disclosed subject matter.

In an exemplary embodiment of the present disclosure, a method for fabrication of a composite structure comprises receiving at least one specification for a composite structure design, the composite structure including a plurality of core panels; generating a manufacturing model of the composite structure design, the manufacturing model including a plurality of core panels; extracting at least one optical projection file from the manufacturing model, the optical projection file(s) having coordinates for projection of a marking(s) within a mold; identifying select reference features associated with a core panel; projecting at least one marking to depict an edge of a core panel; and comparing core panel reference features to the projected edge of the core panel.

At locations where the comparison of the core panel reference features and the projected edge of the core panel do not match, the method adjusts the placement of the core panel, and/or adjusts the manufacturing model, which can include updating select core panel measurements.

The projecting can be performed by a plurality of overhead lasers that are configured for relative movement with respect to the mold, and/or configured for relative movement with respect to each other. Additionally, the optical projection file(s) include edges of core panels, and all core panel geometry is projected simultaneously or in a serial (i.e. one panel at a time) fashion. For purpose of illustration, the present disclosure can be embodied wherein the composite structure is a wind turbine blade including a root section and a tip section.

Additionally, the present disclosure includes a method for fabrication of a wind turbine blade comprising: receiving at least one specification for a blade design, the blade design including a plurality of core panels; creating a mold, the mold configured for forming the blade and having a plurality of reflective targets included therein; generating a 3D manufacturing model of the blade design, the manufacturing model including a plurality of core panels; extracting at least one optical projection file from the manufacturing model, the optical projection file(s) having coordinates for projection of a marking(s) within a mold and digital coordinates for the reflective targets; calibrating an optical projection apparatus; wherein calibration includes comparing the projected marking to the digital location of the reflective target.

In an exemplary embodiment, the mold is created from a plug, the plug including reflective projector targets which are embedded into mold. Also, the projection apparatus includes a plurality of lasers, each laser aligned with six or more reflective targets. Additionally, adjacent laser projectors can be aligned with one or more shared reflective targets.

In some embodiments, calibration of the optical projection apparatus is performed at an elevated temperature, and the reflective targets (e.g. mirrors) are embedded within the mold.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1:
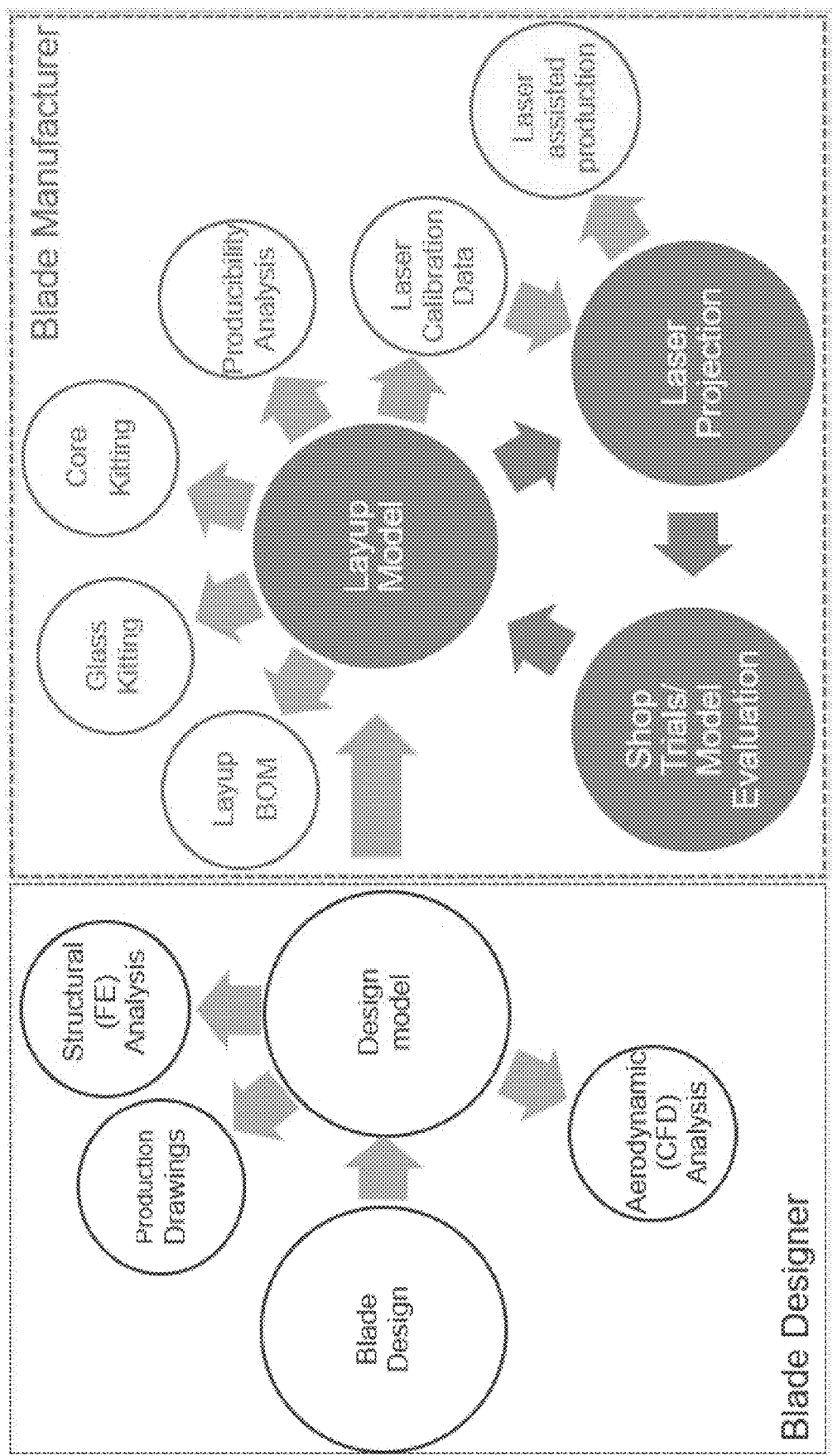
FIGS. 1-4 are schematic representations of a model-based Layup flow charts in accordance with the disclosed subject matter.

FIG. 1 depicts a blade model-based design/manufacturing process flow chart including the design input as well as the manufacturing outputs regarding the layup process. The calibrated manufacturing model as described herein, could support an array of engineering disciplines (e.g. modelling, producibility-kitting, analysis) as well as production disciplines (e.g. glass layup, core placement, paste bead application).

Figure 2:
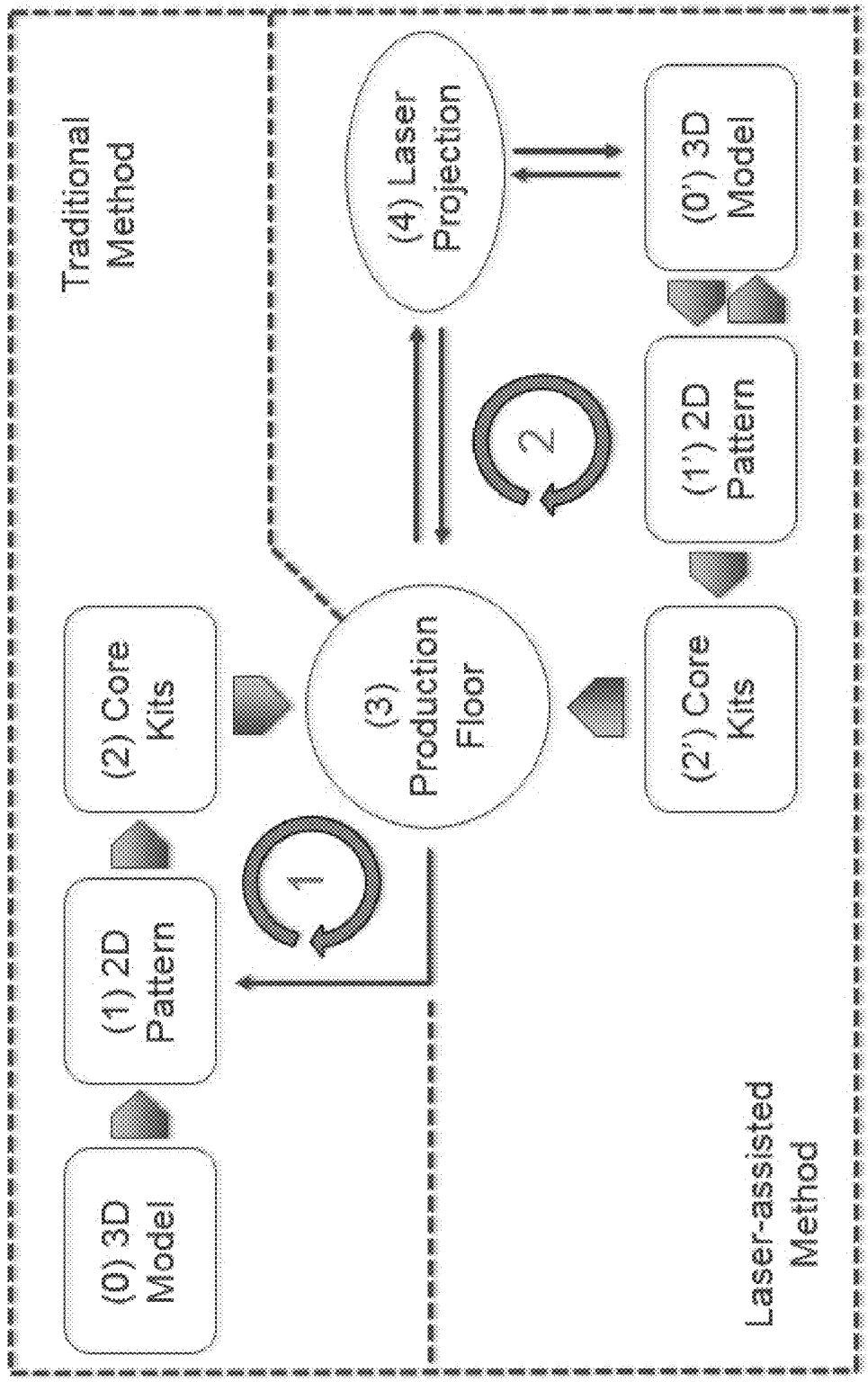

The top section of FIG. 2 shows, in a traditional approach, the process begins by generating the 3D model of a core inside the mold (step 0). Using this model, the flat pattern of the core (2D layout) is generated. The 2D layout is then virtually divided into several panels (step 1) and is provided to the kit supplier (step 2). The size and shapes of each panel can vary, with the maximum size of the panels being driven through logistic considerations (e.g. material handling). Following the first core placement trial during a new product launch, manual measurement tools are required to identify the deviations (including both design and manufacturing related cases) and through several iterations (loop 1) between in-mold manual measurements and 2D drawing revisions, the kitting pattern is finalized.

In accordance with the disclosed method as shown in the bottom section of FIG. 2, after flattening the 3D model and specifying the edges of the panel pieces (step 1'), the 2D kitting patterns are mapped back to the 3D model (steps 0'). In some instances a plurality of edges are specified for a given panel piece. For instance panel pieces which are installed within the root section can have a greater number of edges specified than panel pieces which are installed within the tip section of the blade. In some embodiments, all edges are specified whereas in other embodiments only select edges of a given panel piece are specified. For instance, in regions of the mold in which the contour is changing across panels, a greater number of edges can be specified to provide a higher density mapping to accurately capture the gradient of the mold.

Using the updated model, the optical (e.g. laser) projection files are extracted (step 4). These projection files can be sent to all optical projectors, or in some embodiments only select projectors (e.g. root projection files sent to only those optical projectors which reside above the root section of the mold/blade). Also, the projection files can include a key (e.g. prefix or suffix, similar to addressing of Internet Protocol packets) which signals that two particular projection files are to be maintained in a consecutive manner as they are directed to adjacent panels within the mold.

During the core placement process on the shop floor (step 3), the projected laser lines are used to identify the panels that are deviating from the model. In some embodiments the identification of panel deviation can be performed automatically (e.g. optical camera) with predefined acceptable tolerance ranges. Additionally, or alternatively, the identification of panel deviation can be performed (or confirmed, if initially performed automatically) via manual inspection by the operator. When a deviation beyond the acceptable limits is identified, the panel can be repositioned, or discarded, as desired. Also, an alert can be signaled if/when a panel deviates beyond the acceptable tolerance to highlight this deviation. In some embodiments a confirmation that the deviation has been addressed must be entered in order for a subsequent pattern to be projected.

Finalizing the core kitting pattern takes place through iterations (loop 2) between laser-assisted in-mold measurements and 3D model. These iterations can be performed on a global approach, e.g. the entire loop is repeated, or only select sub-routines of the loop can be repeated, as desired. Secondary to any modification attempts, the 3D model is updated and both 2D patterns and laser projection files are revised accordingly.

These deviations are mainly due to the fact that 3D models are not completely representative of the actual geometry of the mold as well as the glass and core layers. In addition, due to their porous structure, core materials may slightly deform before they are placed into the molds. One of the advantages of the disclosed method is the significant reduction in number of aforementioned iterations between loop 1 and 2.

The magnitude of acceptable error can depend on the materials employed, and the operating environment for a given blade. In some embodiments the acceptable error, or tolerance, can vary along and across the blade location. For example, the acceptable tolerance, or range deviation, can be smaller at locations of material transition and/or thickness transitions, as well as along the leading and trailing edges.

Figure 3:
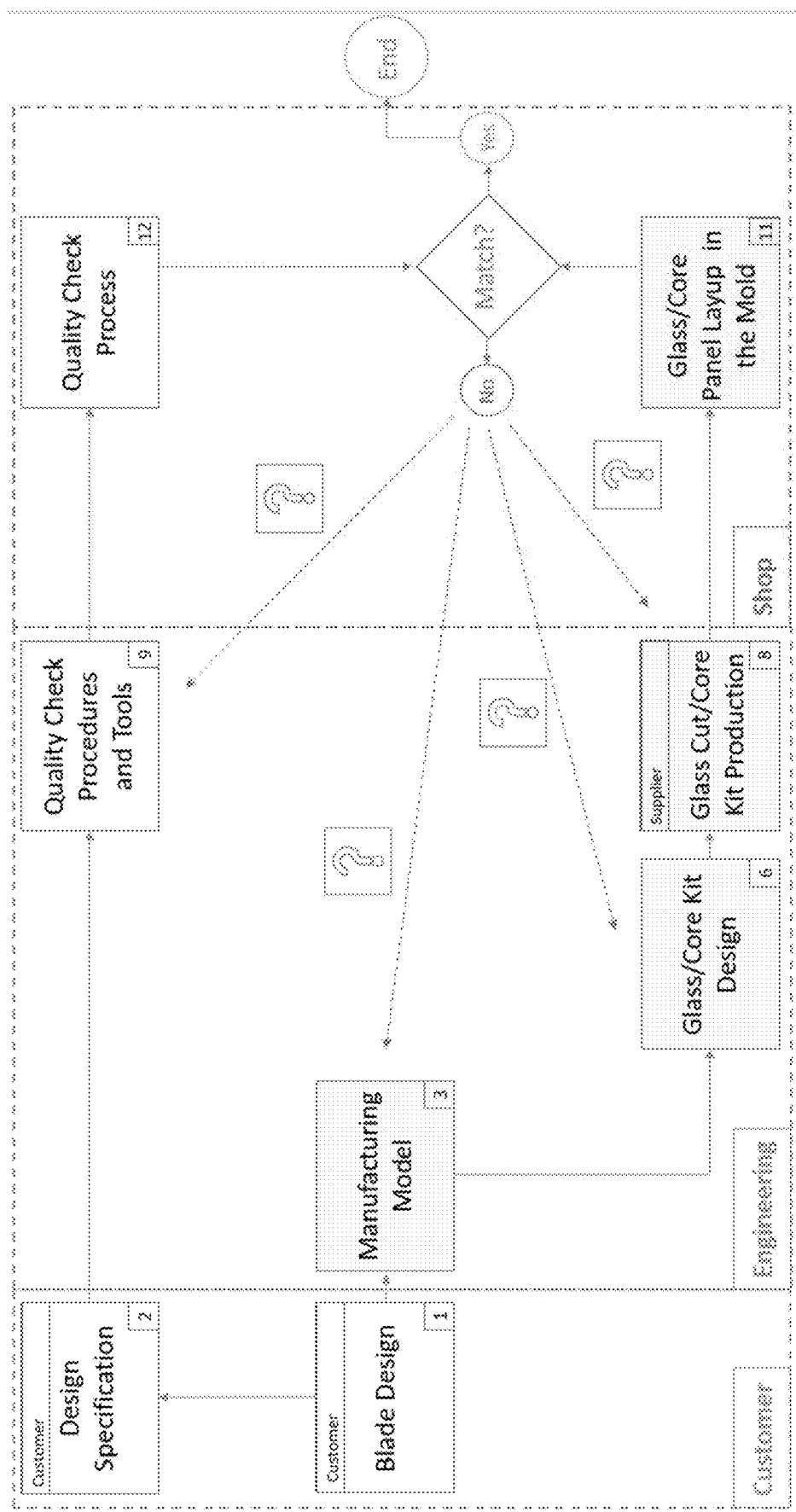

FIG. 3 is a flowchart of a conventional layup design and execution approach in which once the blade design (e.g. dimensions of length, chord, camber, etc.) is finalized, its specifications (1 and 2) are determined. From these input criteria, the manufacturing model is generated (3). This model is then used to design the glass cut and core kit (6), which can be a plurality of subsets which combine to form an aggregate to form the blade. These glass cuts and core kits (6) are then approved for production. During this stage quality check procedures and tools (9) are also generated. Upon delivery of the kits, the shop activities begin. These activities include laying up glass pieces and core panels in the mold (11). Once placed, their location is verified using the quality check process (12). If approved, the core placement process is considered as complete. Often, however, discrepancies in position are identified in the layup and the quality check process fails. Due to the open-loop structure, it is extremely difficult, if not impossible, to determine root-cause-analysis of the discrepancy and make the appropriate changes. Therefore, the troubleshooting stage is often long and cumbersome. The techniques and corresponding apparatus of the presently disclosed system is advantageous in that it addresses the shortcomings of the conventional approach, simplifies the complexity and shortens the duration of this stage by providing a closed-loop optimization process.

Figure 4:
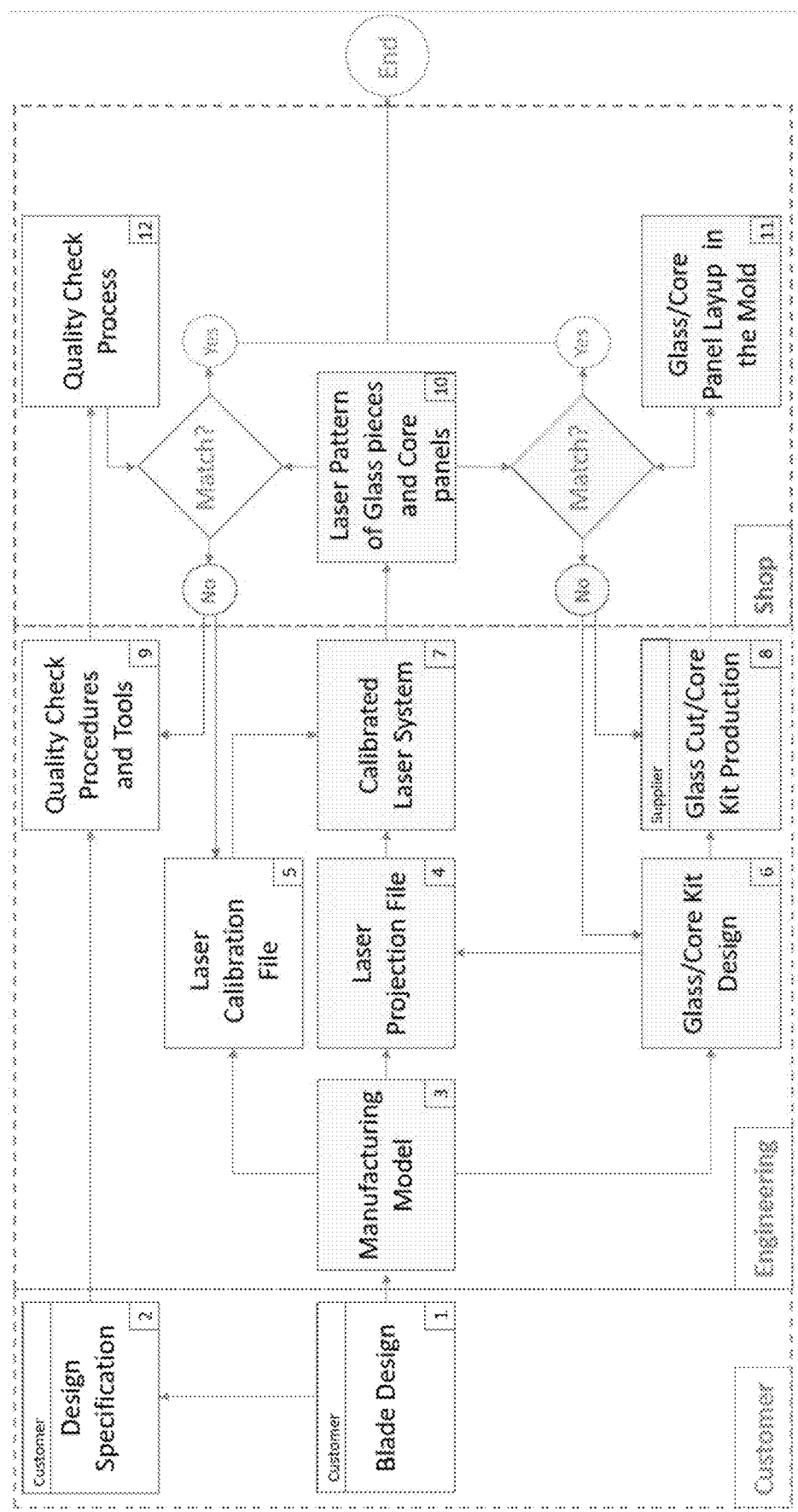

FIG. 4 is a flowchart of a novel approach for optimization of blade manufacture using an optical projection system, as disclosed herein. Once a blade design (e.g. dimensions of length, chord, camber, etc.) is finalized, its specifications (1 and 2) are determined. From these input criteria, the manufacturing model is generated (3). This model is then used to extract laser projection files (4), as well as glass and core kit design (6). The projection files can include the edge locations of each panel/segment (e.g. entire perimeter of the panel/segment) to be placed throughout the mold to form the composite structure, e.g. wind turbine blade. Additionally, the projection files can include an indication of the center of origin used in calculating/determining the aforementioned edge locations.

After kit design is finalized, extra patterns can be added to the projection files that specifically locate the features related to core panel placement in the mold (e.g. distance from trailing edge, spar cap, etc.). These additional patterns can be based on the location, and/or type of core structure/material within the mold. Some exemplary core materials include end-grain balsa, styrene acrylonitrile (SAN) foam, polyvinyl chloride (PVC) foam and polyethylene terephthalate (PET) foam. In some embodiments, e.g., balsa and foam cores, the cores may be scored or segmented to create hinges that allow it to conform to curved surfaces. This scoring can create gaps in the surface of the core where one segment angles away from another. Accordingly, the additional patterns can be focused on these "problem" areas where there is a higher risk/likelihood of gaps forming. Additionally or alternatively, there can be a higher concentration of additional patterns located in the higher load-bearing sections, e.g. root, than in the lower load-bearing sections of the blade.

Additionally, the optical projection system is installed and calibrated (5), as described in further detail herein, and the core kit design is forwarded to the supplier for production (8). Once the optical (e.g. laser) projection files and calibration steps are complete the shop activity begins.

To provide design feedback all glass and core reference features defined by the quality check process (12) are tested against the laser projection of glass and core reference features (10). If any discrepancies are observed at this stage, it is immediately concluded that either the quality references or laser calibration should be reviewed and revised. In some embodiments, the manufacturing process can be temporarily suspended until this review/revision is conducted. In some embodiments, this review/revision can be performed can require an operator/employee confirmation or approval.

Additionally, the present disclosure provides two separate quality checks to confirm accuracy of the panel placement. As shown in FIG. 4, there are two "match" diamonds presented in the flowchart, the upper "match" diamond compares the projected laser pattern and can relay/update/correct discrepancies with the Laser Calibration File (5). Similarly, the lower "match" diamond compares the projected laser pattern with the core panel placement within the mold, and can relay/update/correct discrepancies back to the core/glass panel design (6, 8)

Once approved, the glass and core is laid down using the laser pattern as guidance using a method where a majority of pieces and panels are placed based on a direct laser reference. In other words, each part is positioned within the mold at a location in which its edge(s) is aligned with the projected laser reference line. If a discrepancy occurs between the projected geometry and the piece(s), the laser projections facilitate isolation of individual parts and an enhanced categorization of the discrepancy. This process provides sufficient information to quickly determine the root-cause-analysis which allows for accurate diagnosis of the problematic aspect of the manufacture (e.g. either the kit design or production).

Using this approach, the glass and core kitting and fitting processes have a closed loop configuration (e.g. the highlighted items 3, 4, 6, 7, 8, 10, 11 in FIG. 4) and troubleshooting process is significantly streamlined.

Figure 5:
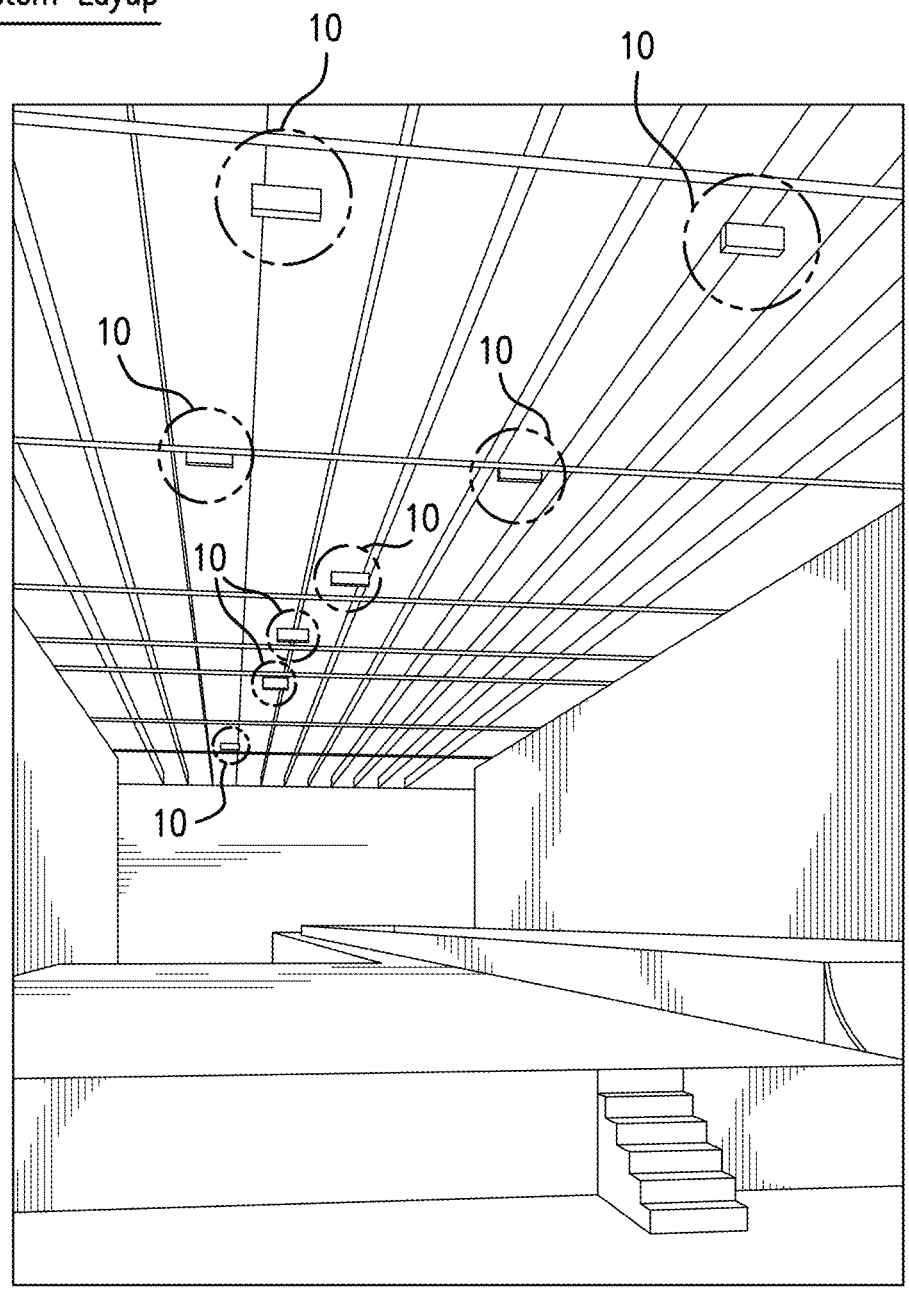
FIG. 5 is an exemplary view of an overhead projection system disposed above a blade mold.

FIG. 5 is an illustration of an exemplary embodiment of the optical projection system. In this exemplary embodiment a series of lasers (10) are positioned above the wind turbine mold and project patterns downward onto the mold during the manufacturing process. The number of laser projectors depends on the length of the blade as well as the height of the projectors with respect to the mold surface. The position of projectors in this exemplary embodiment are fixed but include Galvo-driven mirrors built in each projector, such that laser beam reflections are moveable to create the 3D contours. While the lasers shown are independently mounted in a fixed position, alternative configurations are contemplated in which all or a subset of laser projectors are capable of relative movement with respect to each other. For example, a laser projector can adjust its vertical position with respect to the blade mold, e.g. descend from the ceiling to be positioned closer to the mold, so as to provide a more focused and vivid pattern line of higher resolution. The projectors can be programmed with predefined patterns for projection onto the blade mold (and/or any layup materials that may be disposed therein). Each blade design can require a distinct projection pattern, and thus a unique program inputted into the projection system.

EXAMPLES OF AN EXEMPLARY EMBODIMENT

The projected laser-assisted core kitting system disclosed herein was tested during the design and installation of a structural core of a wind turbine blade. The core was designed in-house using a 3D model to generate both a 2D flat pattern and 3D laser projections of the intended panel positions. The results of the projected laser-assisted core kitting system disclosed herein confirmed the benefits of providing the data needed to perform a root-cause-analysis and closing the design loop when panels do not fit as expected. In many cases the installation method and traditional measurement techniques, rather than the core design, were found to be to be the root-cause of panel misfit and were addressed simply by having associates align the core to the laser lines.

Under the conventional process, measurements are taken either by hand with a tape measure and flexible ruler or with a FARO tracking laser. However, in a wind turbine mold setting, manual measurement with a metal tape measure is inaccurate along a curved surface and cannot account for thickness buildup from material already placed in the mold. Tape measures are also of limited use measuring angular deviations and present many opportunities for reading human error. Additionally, laser tracking with a FARO device is slow to collect data, is a limited resource during a new product launch, and already has a tolerance stack-up (i.e. accumulation of multiple discrete variances) from the tooling. With limited options for data collection, engineering typically chooses to simply adjust panel sizes based on how associates cut and patch panels during installation without performing a root cause analysis of the misfit. Failure to identify and fix underlying issues creates problems when subsequent tooling lines are started and the core does not fit correctly in subsequent molds, driving further data collection and changes.

Accordingly, the projected laser-assisted core kitting system disclosed herein was employed wherein the projections were created from the 3D model as curves that outline the controlling locations. In this exemplary embodiment, the edges along the blade leading edge, trailing edge, auxiliary spar cap pocket, and material transitions are modeled and projected into the blade mold. Additional reference lines can be projected periodically, e.g., for every two to three panel edges, to serve as a visual confirmation that panels are being placed as modeled.

The modeling process of the present disclosure accounts for various material properties of the components used, e.g., the thickness of the dry glass, prefabricated parts, and consumables that are placed below the core, locating the boundaries and transitions more accurately than any previous measurement methods. Accuracy is further improved over the conventional approach by using a local alignment method that eliminates tolerance stack-up from the tooling and corrects for mold expansion at elevated temperatures. In accordance with an aspect of the optical projection system disclosed herein, all core geometry can be projected at once, providing engineering with an instantaneous visual evaluation of the core fitment. Additionally or alternatively, select regions (e.g. root vs. tip) can be projected in isolation, e.g. in a serial fashion, and/or for different durations. For example, the tip section may have the edges projected for a longer time than the root section edges.

The implementation of the optical projection system disclosed herein, provides myriad of advantages over the conventional technique. For example, the system and method disclosed herein:

1) Aids discovery of root-cause of poorly fitting panels;
2) Provides an in-process check on other measurement methods (previously not available, would require cutting blade to permit inspection);
3) Permits rapid visual identification of panels cut incorrectly by supplier in lieu of a time consuming incoming inspection;
4) Reduces measurement mistakes by the production team which would otherwise cause delays when found by quality.
5) Shows angular misalignment caused by complex curvature.
6) Reduces noise in panel fit data, enabling a quicker revision process.
7) Provides consistent panel placement by projecting reference edges to reduce tolerance stack-up. This eliminates the need to always start in the same location, granting more flexibility to the production team; and minimizes waste by eliminating the need for extra material stock typically required.

During conventional blade manufacture, any misfit in the core was attributed to the design and production of the core panels, and the core drawings would be adjusted to suite. The use of current disclosure now introduces a visible third datum, which often aligned with either the core or the incumbent reference. In the case were the laser projections matched a marked line, the core was quickly determined to be designed or cut incorrectly, in line with our incumbent process. Examples include the supplier missing notes from the drawing, or a detail being missed in the design.

In the case where the core matched the laser projection, but disagreed with other measurement methods, further investigations were made. The measurement techniques and outcomes are discussed below.

Figure 6:
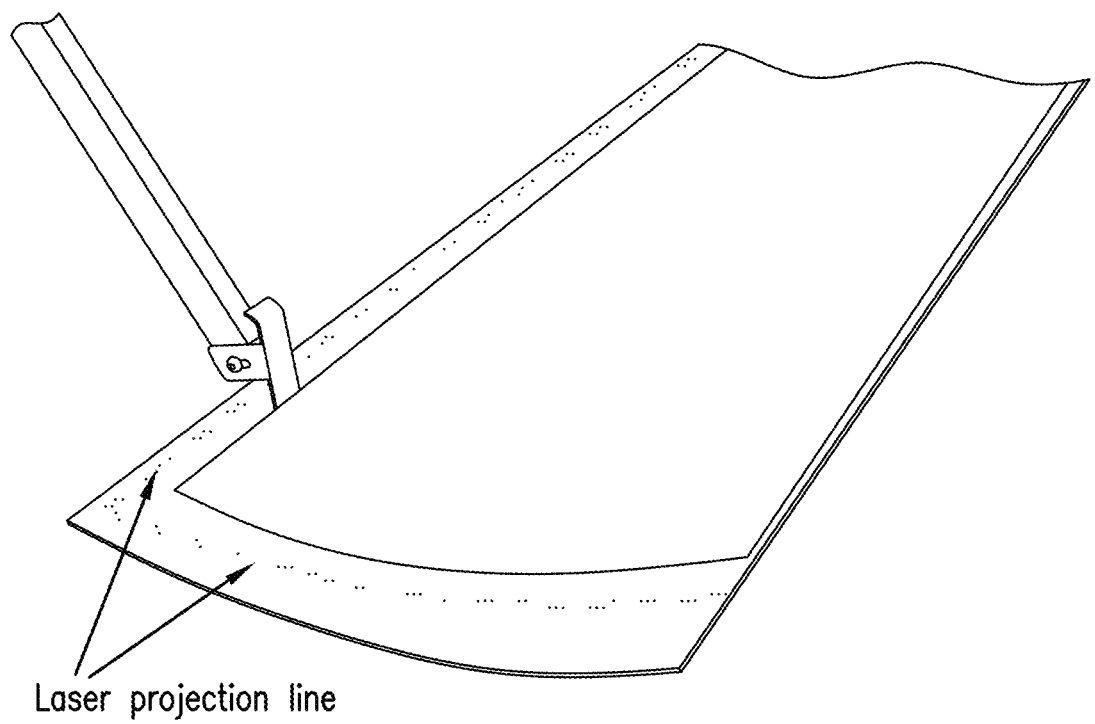
FIGS. 6-11 are exemplary views of layup segments with laser projection lines in accordance with the disclosed subject matter.
Figure 10:
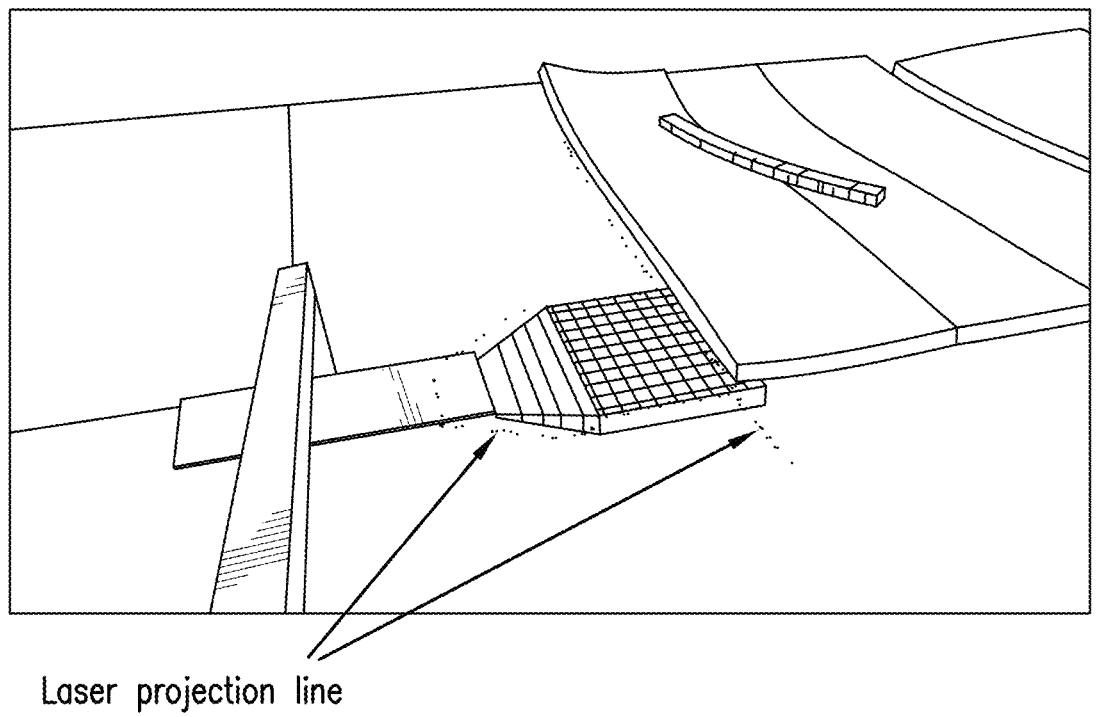
Figure 11:
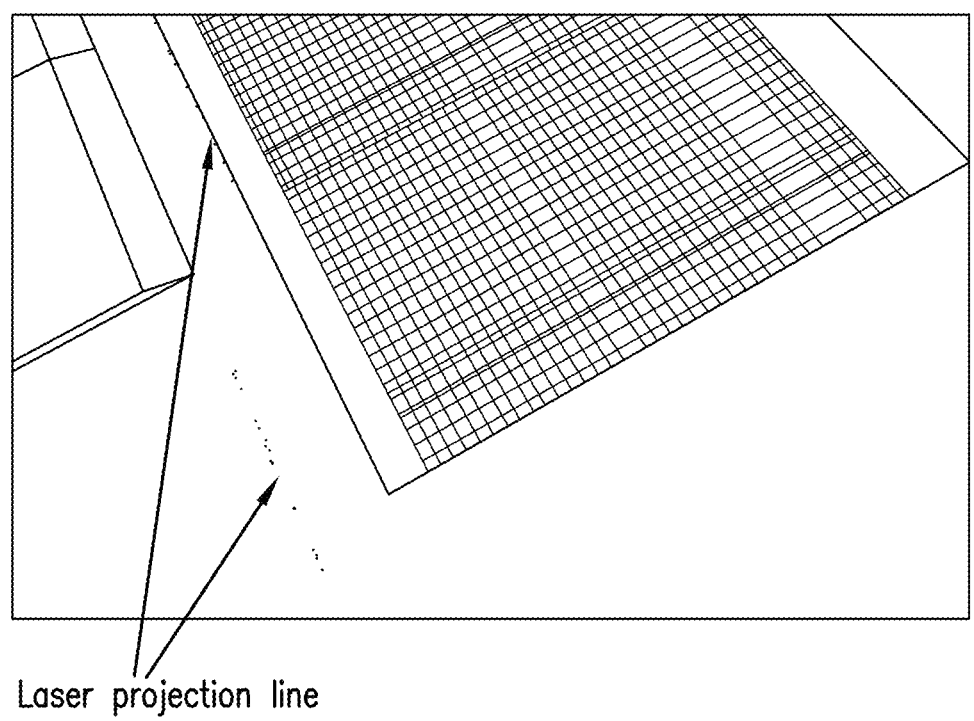

Under the convention approach, the first two blades required 26 supplemental panels taken from other core kits to fill gaps. In contrast, only two panels were required for the third blade when the laser projection system disclosed herein was employed, demonstrating that an accurate installation method is as important as an accurate design. The following additional root causes of core misfit were identified through the use of presently disclosed projection laser system:

Spar cap location was found to be out of tolerance when the prefab was placed on the layer of CFM that was positioned by laser projector. (See FIGS. 6, 10 and 11 depicting spar cap misalignment identified by laser projection). On the pressure side it was previously ignored because it was in tolerance at +/−5 mm, but the effect on core design is significant since the placed tolerance is only +/−10 mm in the chord direction. Where the core would have been adjusted under the conventional technique, it can now be left unchanged to fit a nominal spar cap position. On the suction side of the blade it had simply been missed, under the conventional technique, that the spar cap was out 18 mm at the root. Both pressure and suction side spar cap positions can now be re-adjusted closer to nominal by employing the laser projection system disclosed herein.

Auxiliary spar cap placement fixtures were located using the conventional FARO tracker but did not align with the laser projections of the present disclosure. Due to mold shrinkage, that the FARO does not correct for, and an incorrect assumption about design by the tracking team, the fixtures were positioned out of tolerance. The core fit well when placed according to the laser line without the fixtures, as disclosed herein.

Figure 7:
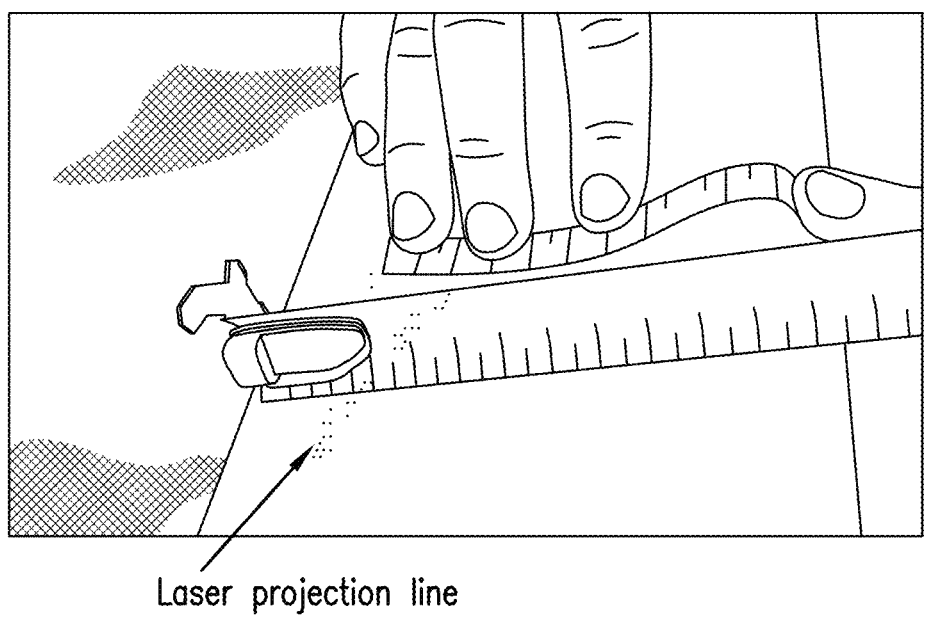

The leading edge offset to the core was marked incorrectly by quality review under the conventional technique. Making a straight line measurement with a tape measure that does not conform to mold surface, failure to correct for the difference between aero edge and tool edge, failure to account for material thickness, and making a wide marker line past the end of the tape measure altogether produced a marked line that was 15 mm too far into the blade. (See FIG. 7 depicting improper technique in conventional manual measurements). Associates then cut the core 20 mm shorter so the full marker line would be visible when the core was placed, rather than targeting nominal. Without the laser projections as disclosed herein, the core would have been redrawn 20 mm shorter to match. Accordingly, implementation of the current laser projection system resulted in no change being needed.

Along the trailing edge the laser and manual markings were initially matching due to the flatter curvature.

Over the course of installation a 10 mm deviation was observed between the laser and the marked line. After re-measuring quality determined that the TEDD prefab had slid 10 mm into the blade away from the trailing edge, taking the marker line with it.

Figure 8:
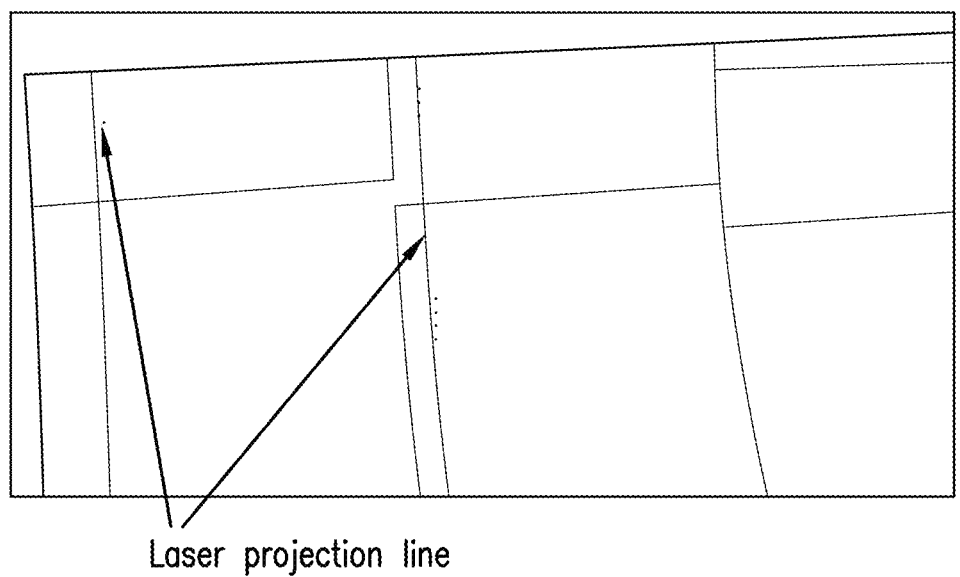

The panels were designed to sit square against the spar cap, which is angled slightly from chordwise. Without lasers the team fit the panels to a chordwise line, causing gaps and interferences in the fit. When placed according to the lasers the core fit well. The use of the lasers eliminated a need for extra training, documentation, or specific product knowledge. (See FIG. 8 depicting chordwise lines).

Figure 9:
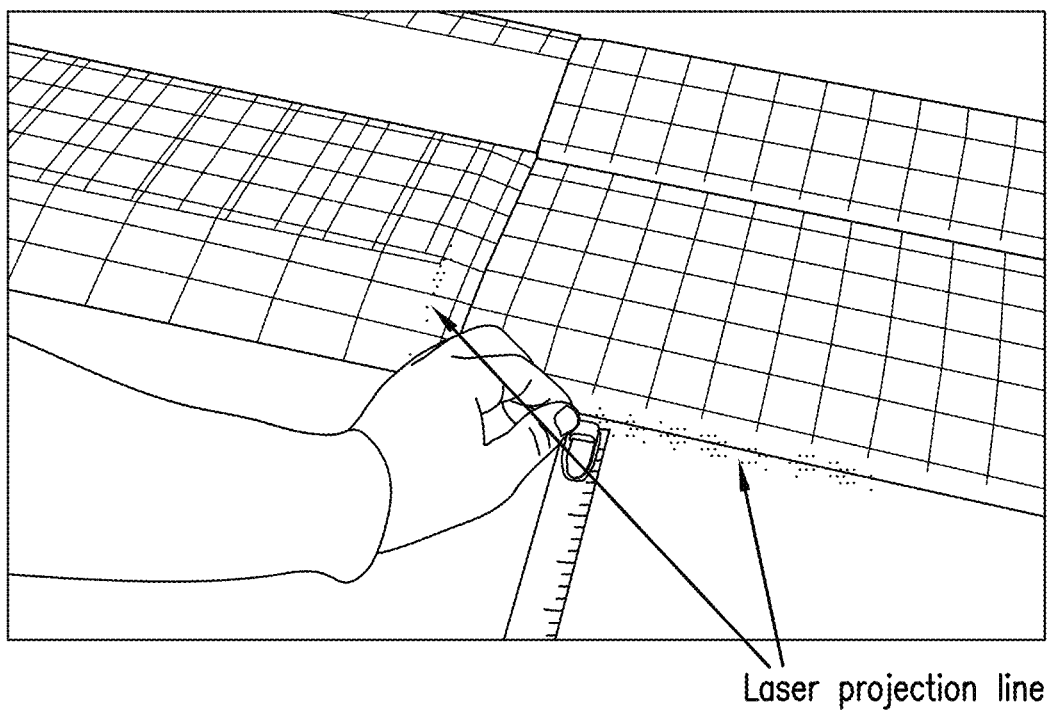

Complex curvature on the suction side in the transition from round to max chord caused an angular deviation. Projection of panel edge lines allowed fast visual identification of the specific area that deviated so the sources of the error could be identified and fixed. The conventional process would have made the changes at the next transition, leaving as many as a dozen panels misaligned from the intended position. (See FIG. 9 depicting manual measurement inaccuracies over TEDD due to thickness buildup; laser projections match core position).

Accordingly, the projections of all core geometry identified errors early in the installation process. The location in the spanwise direction between panels is defined as the top of the chamfer in transitions between two panels. This can be mistaken in production for the edge of the panel. Unlike marker lines that can get covered as soon as core is put down, the laser line continues to show on top of the core and allows an observer to see and point out a mistake. Following the traditional method, quality would check the position, but only after many neighboring panels had been installed. The projected laser system disclosed herein also protects against situations where erroneous markings are made in the spanwise location to indicate where to begin laying panels, and allow for the mistake to be quickly recognized and corrected.

In summary, the conventional technique for the installation of core on blades required 26 extra supplemental core panels to fill gaps. In contrast, with laser-assisted core installation disclosed herein, only two panels were needed. This demonstrates that without lasers even a well-designed kit may appear not to fit, and that accurate placement of each individual panel can reduce the number of field changes required to make a core kit meet tolerance. Additionally, projection lasers are a crucial tool in understanding the root causes of tolerance stack-up, and provide a fast and efficient path towards a production-ready core kit.

Therefore, and in accordance with the disclosed subject matter, the optimization method disclosed herein eliminates the need for manual measurement and open-loop kit revision which significantly lowers the number of required iterations and the final pattern fits with higher levels of precision. Further, the disclosed optimization method allows for continued manual operator measurement to confirm tolerances are within acceptable ranges, if so desired.

Model-Based Calibration

In accordance with another aspect of the disclosure, a model-based calibration technique is disclosed for calibrating the projection apparatus, e.g. plurality of Galvo-driven laser projectors.

Figure 12:
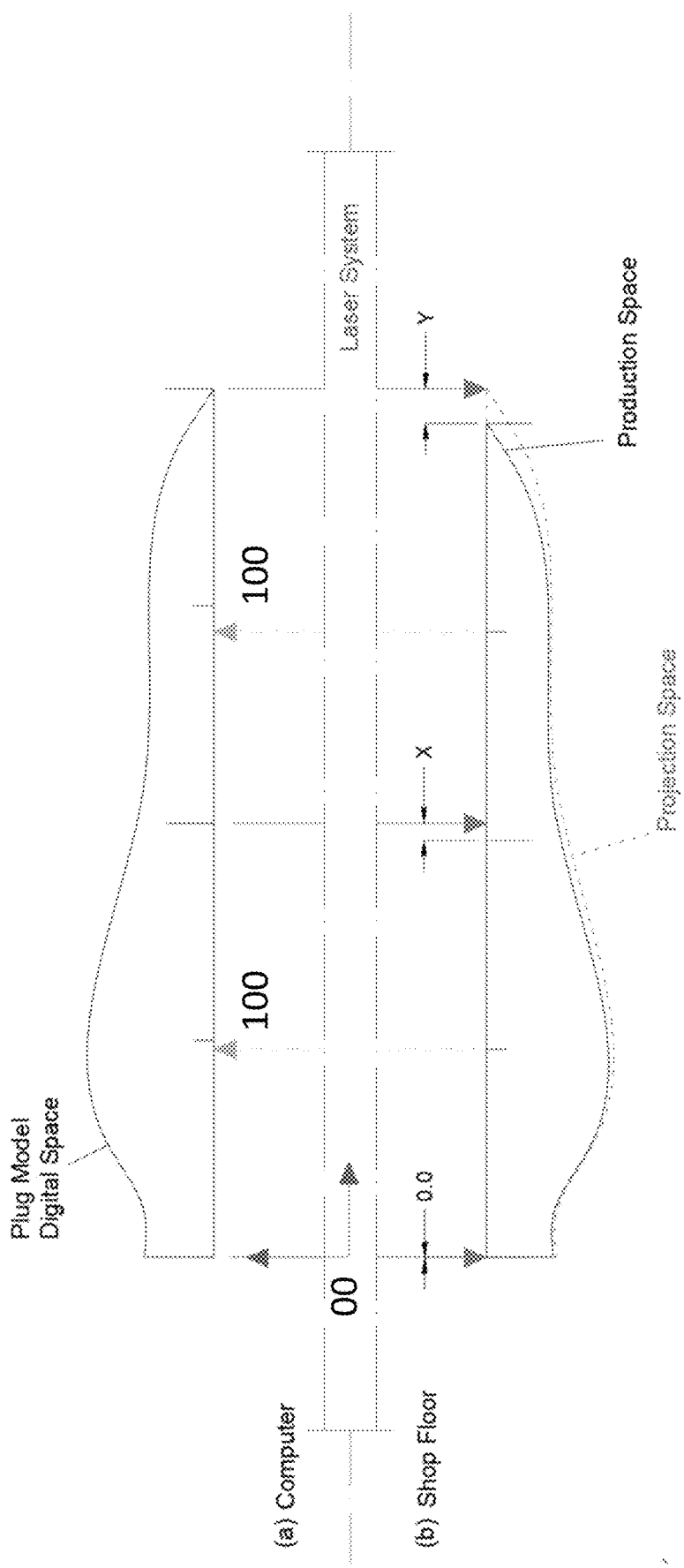
FIGS. 12-14 are exemplary views of a model-based calibration technique in accordance with the disclosed subject matter.
Figure 13:
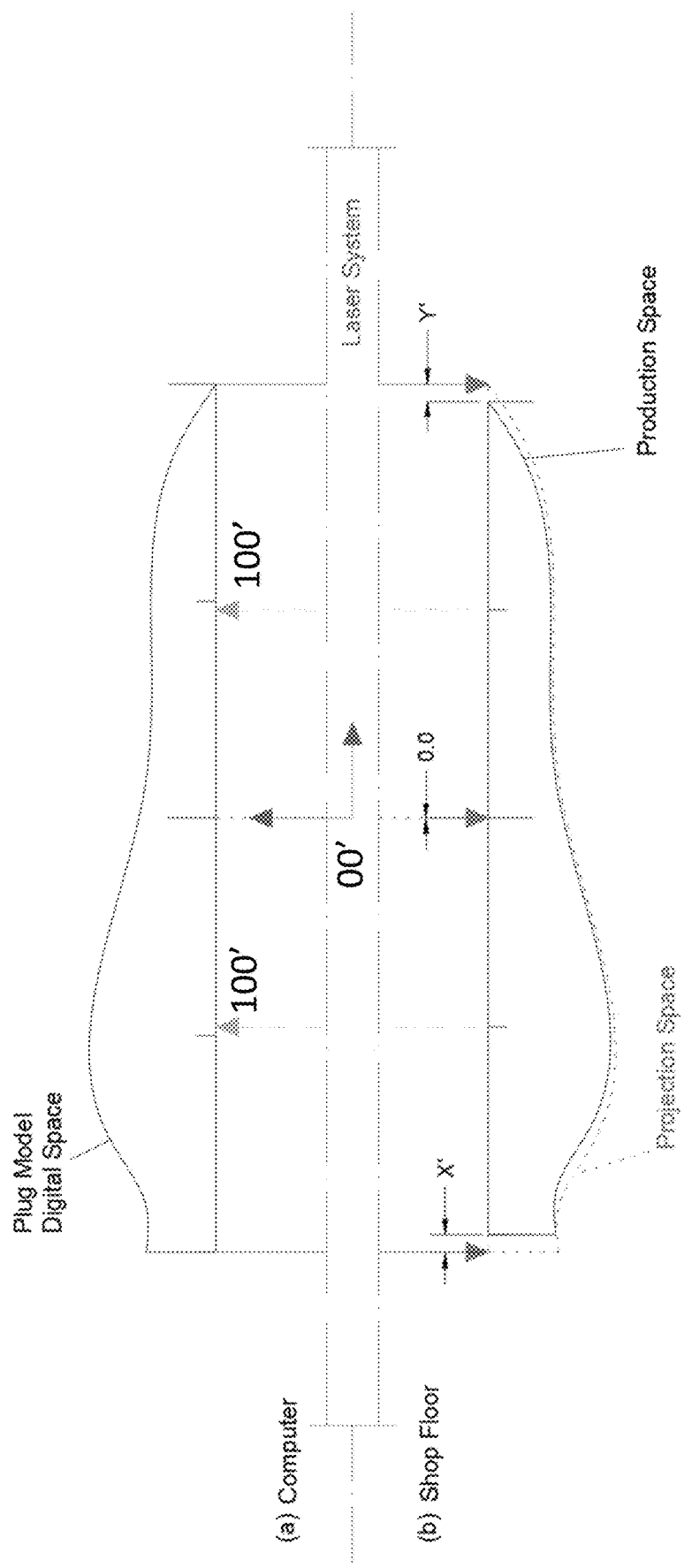
Figure 14:
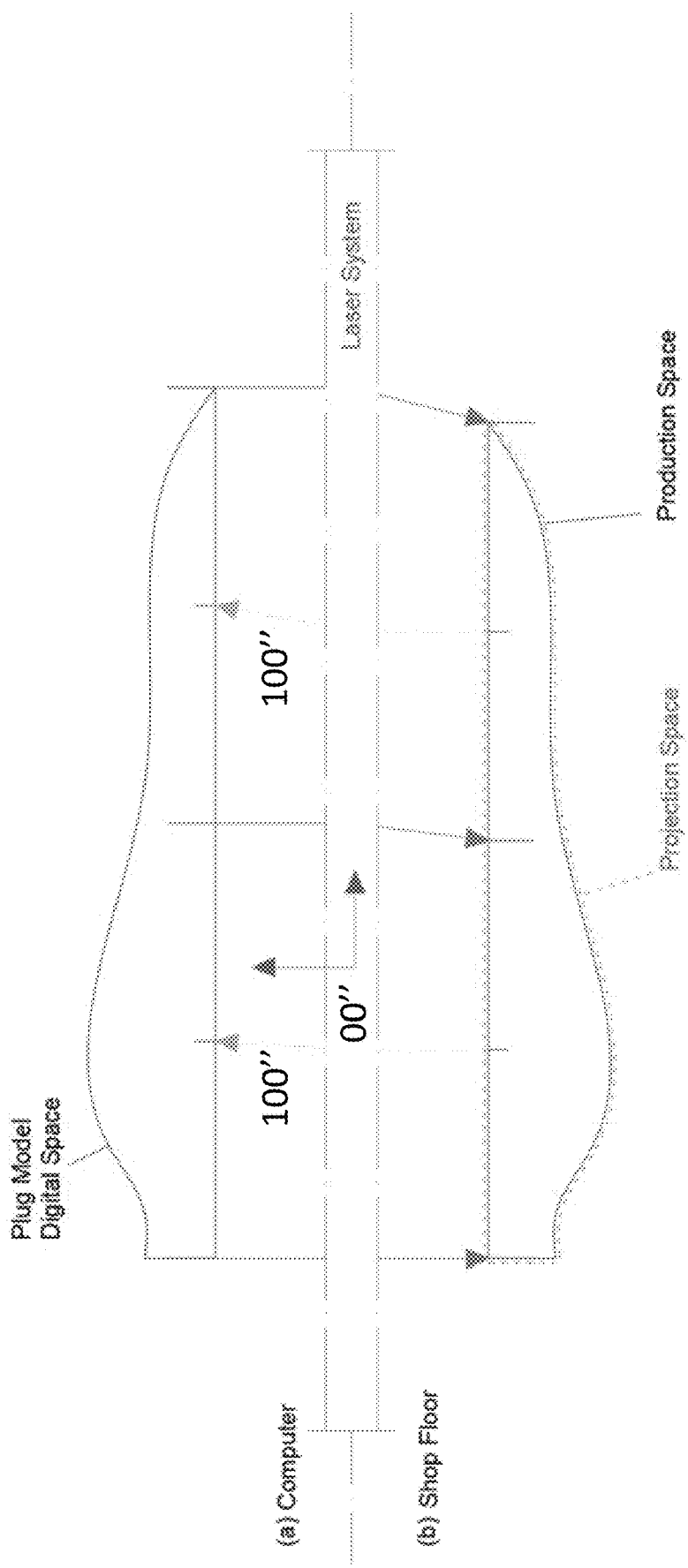

FIGS. 12-14 schematically show the distortion of the mold surface in production space (FIG. 12-14—in the lower half of the figure represented by the "(b) Shop Floor" label) relative to the plug geometry (FIG. 12-14—in the upper half of the figure represented by "(a) Computer)" in digital space. This deformation could be caused by thermal loads or any other disturbing forces applied during mold production and service. While original plug geometry (from which the mold for creating the wind turbine blade is created) and distorted geometry are identical in all three figures, projection patterns are unique to the alignment methodology that is implemented in each case.

The traditional projection alignment method is depicted in FIG. 12. In this approach, coinciding the coordinate system origins for both production ("(b) Shop Floor" label) and digital ("(a) Computer") spaces near the root of the mold, position of the markers in the production space as described in the universal coordinate system is used (100) to align the projection system. Following this method, the difference between the position of geometric features pre and post deformation leads to deviation between the laser projection space and production space. In the case of thermal shrinkage, as the deviations are stacking up starting from the origin of the coordinate system (00), error between each feature and its associated projected pattern is increasing from root to the tip (Y>X). As the structure is tapered and non-homogeneous, the change in the deviations are not linear (Y≠2X).

To improve the large stacked up error at the tip region, one solution would be to shift the origin of the coordinate system (00') toward the middle of the tooling as shown in FIG. 13. In this scenario, although the alignment method is identical to the previous case (using the actual marker positions to for alignment purposes) the summation of deviations between geometric features and their projected patterns is reduced. In addition, since the origin of the coordinate system is in the center of geometry, deviations are spreading toward tip and root sections in a pseudo-symmetric manner (not completely symmetric as mentioned in previous section X'≠Y') and the maximum deviation around tip and root are less than previous case (X'<Y and Y'<Y).

The process disclosed herein provides a methodology that eliminates the deviations between projection and production spaces as shown in FIG. 14. In this arrangement, detected position of the markers in universal coordinate system as installed on the tooling (FIG. 14, "(b) Shop Floor") is mapped to their equivalent mating feature in the digital space (100'). Full mapping of production space into the digital space automatically result in a precise match between the projection space and production space in the shop floor. In other words, proposed mapping approach, distorts the projection space to match the actual production space on the shop floor. Therefore, any kind of deformations on the tooling could be compensated this method. In addition, this approach is not sensitive to the location of the coordinate system origin.

To execute this method, during the calibration process, instead of using the actual location of markers, the equivalent digital position of them is fed to the laser system as the reference points.

Local position tolerance, generally on the order of millimeters, is critical for the relative position of different layers of material to each other and to other features (e.g. leading edge). Global position tolerance, defined as the position of a component at one end of the part relative to the other end of the part, can be a full order of magnitude larger than the local position tolerance. This larger global tolerance facilitates cost savings that are vital to creating a competitive product but increase the difficulty of achieving high local position tolerances. Any replacement measurement technique must conform to both of these accuracy regimes and maintain a continuous reference.

For embodiments in which a laser projection system is installed and calibrated using a single global coordinate system, the extremities of the mold are likely to see local deviations equivalent to the global deformation of the tooling. Location of the target points may then be tuned manually to reduce the observed variation between mold and projection. This method however is unreliable and will require changes on the order of the global deformation, which invalidates the traceability of this positioning back to the digital model. Additionally, this method must be performed at the same temperature used to qualify the tooling, or it will be subject to deviations from thermal expansion.

Local accuracy can be achieved without requiring high global accuracy by using an array of projection lasers, each with its own local coordinate system. Each laser aligns to its own local targets, creating a local best fit coordinate system. In this way the laser may achieve the highest local accuracy possible. Adjacent lasers can be aligned using one or more shared targets. If a global deformation is present, two adjacent lasers can be aligned to different coordinate systems but have a minimal discontinuity at the projection boundary do to shared target locations. This approach permits large global deformations to be represented as a series of small, permissible discontinuities in the array.

In the case of unacceptably large discontinuities between adjacent projectors, two options are available for improvement of fit; either the number of shared projection targets may be increased, or the number of projectors may be increased such that the discontinuity between any two proctors becomes a smaller percentage of the global deformation.

One source of the large discontinuity is the effect of thermal expansion when the tool is heated. Molds are generally qualified at room temperature but are used in a heated state, where thermal expansion can be greater than the allowable position tolerance. The present disclosure provides an approach for aligning laser projectors that can be performed at any temperature since the reflector targets are referenced directly off the tooling itself such that the position of the references scales with the tool as is expands and contracts thermally. Since a room temperature mold is not required, alignment and calibration may be performed concurrent with thermal testing or production. Through the same mechanism the alignment.

In an exemplary embodiment, demonstration or validation of alignment of the projection array occurs before the system can be employed for use in a controlled manufacturing environment. The verification follows a similar process as the alignment; projecting on top of known features that have been transferred from the mold plug into/onto the mold, and trace directly back to the 3D model. Any visually identifiable mold marking may be used, such as mold scribe marks, insert geometries and/or sharp edges. Because these markings are transferred from a CNC cut plug, they provide the same benefits as previously discussed for the alignment of the lasers. The accuracy of the aligned system is then considered to be the maximum distance between a molded geometry and its associated projection. This measurement is small so may it be accurately made with manual techniques such as the use of calipers, tape measure, ruler, etc.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

The invention claimed is:

1. A method for fabrication of a composite structure comprising:
receiving at least one specification for a composite structure design, the composite structure including a plurality of core panels;
generating a manufacturing model of the composite structure design, the manufacturing model including a plurality of core panels;
extracting at least one optical projection file from the manufacturing model,
wherein the extracted the optical projection file(s) include coordinates for projection of a marking(s) within a mold;
extracting a calibration file;
placing a plurality of core panels within the mold;
identifying select reference features associated with a core panel;
projecting at least one marking to depict an edge of a core panel; and
comparing core panel reference features to the projected edge of the core panel;
performing a first quality check of the markings projected in accordance with the extracted optical projection file; and
performing a second quality check of the markings projected and the core panel placement within the mold;
wherein an origin of the coordinate system is located in the center of geometry of the composite structure; and
receiving confirmation that a deviation has been addressed before projecting a marking for a subsequent core panel.

2. The method of claim 1, when the comparison of the core panel reference features and the projected edge of the core panel do not match, adjusting the placement of the core panel.

3. The method of claim 1, when the comparison of the core panel reference features and the projected edge of the core panel do not match, adjusting the manufacturing model.

4. The method of claim 3, wherein adjusting the manufacturing model includes updating select core panel measurements.

5. The method of claim 1, wherein projecting is performed by a plurality of lasers.

6. The method of claim 5, wherein the lasers are configured for relative movement with respect to the mold.

7. The method of claim 5, wherein the lasers are configured for relative movement with respect to each other.

8. The method of claim 1, wherein the optical projection file(s) include edges of core panels.

9. The method of claim 1, wherein all core panel geometry is projected simultaneously.

10. The method of claim 1, wherein select core panel markings are projected in a serial fashion.

11. The method of claim 1, wherein the composite structure is a wind turbine blade including a root section and a tip section.

12. The method of claim 1, wherein projecting at least one marking includes projecting from a plurality of lasers, each laser aligned with six or more reflective targets.

13. The method of claim 1, wherein projecting at least one marking includes projecting from a plurality of lasers, adjacent laser projectors aligned with one or more shared reflective targets.

14. The method of claim 1, wherein projecting at least one marking includes projecting from a plurality of lasers, the lasers configured for relative movement with respect to the mold.

15. The method of claim 1, wherein projecting at least one marking includes projecting from a plurality of lasers, the lasers configured for relative movement with respect to each other.

16. The method of claim 1, wherein reflective targets are embedded within the mold.

* * * * *